United States Patent
Chen et al.

(10) Patent No.: US 9,654,265 B2
(45) Date of Patent: May 16, 2017

(54) SYSTEMS, APPARATUS AND METHODS TO FACILITATE TRANSMISSION OF ACKNOWLEDGEMENT SIGNALS IN WIRELESS COMMUNICATION SYSTEMS

(75) Inventors: Wanshi Chen, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 13/082,090

(22) Filed: Apr. 7, 2011

(65) Prior Publication Data

US 2011/0249647 A1 Oct. 13, 2011

Related U.S. Application Data

(60) Provisional application No. 61/322,238, filed on Apr. 8, 2010.

(51) Int. Cl.
| | |
|---|---|
| *H04L 5/00* | (2006.01) |
| *H04W 72/04* | (2009.01) |
| *H04L 1/16* | (2006.01) |
| *H04L 1/18* | (2006.01) |

(52) U.S. Cl.
CPC .......... *H04L 5/0053* (2013.01); *H04L 1/1614* (2013.01); *H04L 1/1812* (2013.01); *H04L 5/0007* (2013.01); *H04W 72/0406* (2013.01)

(58) Field of Classification Search
USPC ........................................................ 370/330
See application file for complete search history.

(56) References Cited

U.S. PATENT DOCUMENTS 7,957,329 B2 *   6/2011   Ahn et al. ...................... 370/280
2004/0246938 A1 * 12/2004  Schentrup et al. ........... 370/347
2007/0097927 A1 *  5/2007  Gorokhov ............. H04B 1/7103
                                                     370/335

(Continued)

FOREIGN PATENT DOCUMENTS

| EP | 2161864 A1 | 3/2010 |
|---|---|---|
| EP | 2282595 A1 | 2/2011 |
| WO | WO2011019916 A1 | 2/2011 |

OTHER PUBLICATIONS

International Search Report and Written Opinion—PCT/US2011/031825, International Search Authority—European Patent Office—Aug. 17, 2011.

*Primary Examiner* — Tejis Daya

(57) ABSTRACT

In accordance with aspects of the disclosure, a method, apparatus, and computer program product are provided for wireless communication. The method, apparatus, and computer program product may be provided for mapping a first signal to one or more resource elements being utilized by a second signal and transmitting the first signal utilizing the resource elements. The method, apparatus, and computer program product may be provided for pre-defining one or more resource blocks in a data region of a frame structure and transmitting an acknowledgement signal in at least one of the pre-defined resource blocks. The method, apparatus, and computer program product may be provided for identifying at least one downlink control channel and transmitting acknowledgment signals in the at least one downlink control channel for a plurality of user equipment.

18 Claims, 13 Drawing Sheets

(56) References Cited

U.S. PATENT DOCUMENTS

| | | | |
|---|---|---|---|
| 2007/0171849 A1* | 7/2007 | Zhang et al. | 370/310 |
| 2008/0080560 A1* | 4/2008 | Inoue | H04L 1/1671 |
| | | | 370/491 |
| 2009/0097466 A1* | 4/2009 | Lee | H04L 1/0081 |
| | | | 370/344 |
| 2009/0274098 A1* | 11/2009 | Chun et al. | 370/328 |
| 2009/0285160 A1* | 11/2009 | Cheng et al. | 370/328 |
| 2009/0304098 A1* | 12/2009 | Chun | H04J 13/00 |
| | | | 375/260 |
| 2010/0014481 A1* | 1/2010 | Ko et al. | 370/330 |
| 2010/0054188 A1* | 3/2010 | Matsumoto et al. | 370/328 |
| 2010/0135181 A1* | 6/2010 | Earnshaw | H04W 28/06 |
| | | | 370/252 |
| 2010/0208629 A1* | 8/2010 | Ahn et al. | 370/280 |
| 2010/0246701 A1* | 9/2010 | Gerstenberger et al. | 375/260 |
| 2010/0254301 A1* | 10/2010 | Blankenship et al. | 370/315 |
| 2011/0128942 A1* | 6/2011 | Kim | H04B 7/0632 |
| | | | 370/336 |

\* cited by examiner

SYSTEMS, APPARATUS AND METHODS TO FACILITATE TRANSMISSION OF ACKNOWLEDGEMENT SIGNALS IN WIRELESS COMMUNICATION SYSTEMS

CROSS-REFERENCE TO RELATED APPLICATION(S)

This application claims the benefit of U.S. Provisional Application Ser. No. 61/322,238, entitled "Systems, Apparatus and Methods to Facilitate Transmission of Physical Hybrid Automatic Repeat Request Indicator Channels in Wireless Communication Systems" and filed on Apr. 8, 2010, which is expressly incorporated by reference herein in its entirety.

BACKGROUND

Field

The present disclosure relates generally to communication systems, and more particularly, to facilitating transmission of acknowledgement signals in wireless communication systems.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, time division synchronous code division multiple access (TD-SCDMA) systems, and worldwide interoperability for microwave access (WiMAX).

For wireless communication systems, these multiple-access technologies have been adopted in various telecommunication standards to provide a common protocol that enables different wireless devices to communicate on a municipal, national, regional, and even global level. An example of an emerging telecommunication standard is Long Term Evolution (LTE). LTE provides a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards utilizing OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In accordance with an aspect of the disclosure, a method to facilitate wireless communication comprises mapping a first signal to one or more resource elements being utilized by a second signal and transmitting the first signal utilizing the resource elements. In an implementation, the first signal is associated with an acknowledgement signal.

In accordance with an aspect of the disclosure, an apparatus comprises a processing system configured to map a first signal to one or more resource elements being utilized by a second signal and transmit the first signal utilizing the resource elements. In an implementation, the first signal is associated with an acknowledgement signal.

In accordance with an aspect of the disclosure, an apparatus comprises a means for mapping a first signal to one or more resource elements being utilized by a second signal and means for transmitting the first signal utilizing the resource elements. In an implementation, the first signal is associated with an acknowledgement signal.

In accordance with an aspect of the disclosure, a computer program product comprises a computer-readable medium comprising codes executable to cause an apparatus to map a first signal to one or more resource elements being utilized by a second signal and transmit the first signal utilizing the resource elements. In an implementation, the first signal is associated with an acknowledgement signal.

In accordance with an aspect of the disclosure, a method to facilitate wireless communication comprises pre-defining one or more resource blocks in a data region of a frame structure and transmitting an acknowledgement signal in at least one of the pre-defined resource blocks.

In accordance with an aspect of the disclosure, an apparatus comprises a processing system configured to pre-define one or more resource blocks in a data region of a frame structure and transmit an acknowledgement signal in at least one of the pre-defined resource blocks.

In accordance with an aspect of the disclosure, an apparatus comprises a means for pre-defining one or more resource blocks in a data region of a frame structure and means for transmitting an acknowledgement signal in at least one of the pre-defined resource blocks.

In accordance with an aspect of the disclosure, a computer program product comprises a computer-readable medium comprising codes executable to cause an apparatus to pre-define one or more resource blocks in a data region of a frame structure and transmit an acknowledgement signal in at least one of the pre-defined resource blocks.

In accordance with an aspect of the disclosure, a method to facilitate wireless communication comprises identifying at least one downlink control channel and transmitting acknowledgment signals in the at least one downlink control channel for a plurality of user equipment.

In accordance with an aspect of the disclosure, an apparatus comprises a processing system configured to identify at least one downlink control channel and transmit acknowledgment signals in the at least one downlink control channel for a plurality of user equipment.

In accordance with an aspect of the disclosure, an apparatus comprises a means for identifying at least one downlink control channel and means for transmitting acknowledgment signals in the at least one downlink control channel for a plurality of user equipment.

In accordance with an aspect of the disclosure, a computer program product comprises a computer-readable medium comprising codes executable to cause an apparatus to identify at least one downlink control channel and transmit acknowledgment signals in the at least one downlink control channel for a plurality of user equipment.

DETAILED DESCRIPTION

Figure 1:
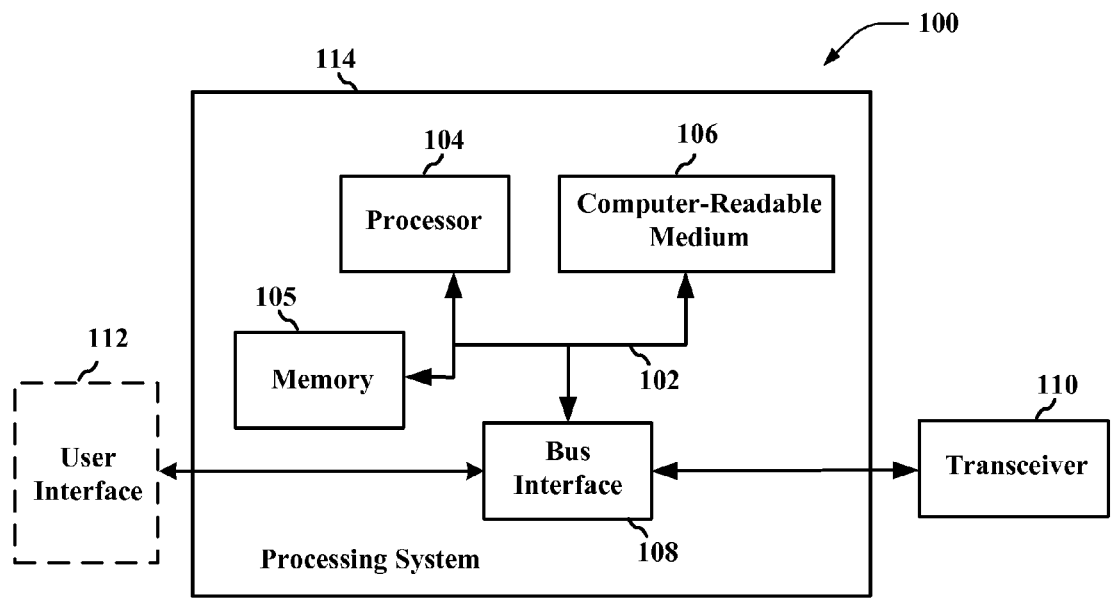
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented utilizing electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

The techniques described herein may be utilized for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often utilized interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is utilized in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In an aspect of the disclosure, a wireless multiple-access communication system is configured to simultaneously support communication for multiple wireless terminals. Each terminal communicates with one or more base stations via transmissions on the forward and reverse links. The forward link or downlink (DL) refers to the communication link from the base stations to the terminals, and the reverse link or uplink (UL) refers to the communication link from the terminals to the base stations. This communication link may be established via a single-in-single-out, multiple-in-single-out, or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

In LTE Advanced (LTE-A) Release 10 wireless communication systems, relay may be employed. In an aspect of the disclosure, relay R-PDCCH (Relay-Physical Downlink Control CHannel) may be supported with resources in the data region, and opportunities exist for supporting relay R-PHICH (Relay-Physical Hybrid automatic repeat request Indicator CHannel) that utilizes the relay backhaul channel. The PHICH is utilized to convey ACK/NAK information for uplink (UL) data transmission. For instance, in LTE Release 8, PDCCH and PHICH are multiplexed and/or interleaved together in the first few Orthogonal Frequency Division Multiplexing (OFDM) symbols in one subframe. Both PDCCH and PHICH are built based on a Resource Element Group (REG) unit, which is referred to as a minimum construction unit for all control channels, including PDCCH and PHICH. For PDCCH, the minimum unit may be further defined by the Control Channel Element (CCE). Each REG includes, for example, 4 Resource Elements (REs), and each CCE includes, for example, 9 REGs or 36 REs. While the PDCCH is built on CCEs (e.g., 9 REGs), the PHICH is built upon a PHICH group (e.g., 3 REGs). PDCCH and PHICH may be interleaved together whereby different REGs are assigned to different types of channels.

The existence of the relay backhaul channel, in some embodiments, may not be enough to justify R-PHICH implementations. For instance, the relay backhaul channel may not be assumed to be dynamic; it may be a less complex design to define only the R-PDCCH in the Release 10 timeframe, and R-PDCCH may be utilized to replace R-PHICH. R-PDCCH may be more costly than R-PHICH (e.g., 40 bits may be transmitted as compared to only 1 bit transmitted over the air).

Embodiments assuming that R-PHICH is not multiplexed with R-PDCCH similar to Release 8 may be employed and are discussed herein. Embodiments utilizing R-PHICH over the air for a relay node or more generally, User Equipment (UE) devices (including relay nodes) requiring interference protection may be employed. As such, systems, apparatus, and methods to facilitate transmission of PHICHs in these and other embodiments are provided herein.

FIG. 1 is a conceptual diagram illustrating an example of an implementation for an apparatus 100 employing a processing system 114 and a memory 105. In one example, the processing system 114 may be implemented with a bus architecture, represented by a bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending on the nature of the apparatus 100, a user interface 112 (e.g., keypad, touchpad, monitor, display, speaker, microphone, joystick) may also be provided to interface with a user.

The processor 104 is configured for managing the bus 102 and general processing, including the execution of software stored on the computer-readable medium 106. The software, when executed by the processor 104, causes the processing system 114 to perform the various functions described herein for any particular apparatus. The computer-readable medium 106 may also be utilized for storing data that is manipulated by the processor 104 when executing software.

Figure 2:
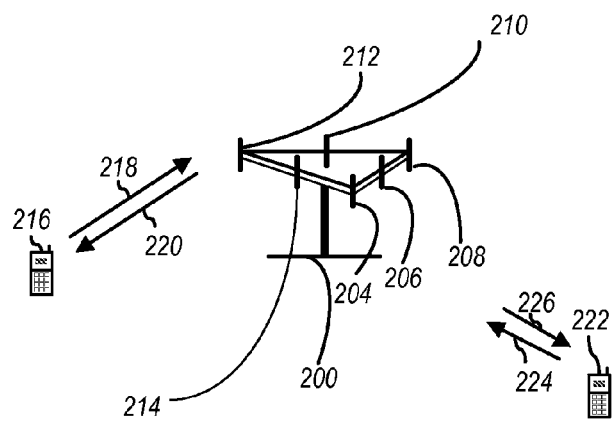
FIG. 2 illustrates a multiple access wireless communication system, in accordance with an embodiment of the disclosure.

FIG. 2 is a diagram illustrating an embodiment of a multiple access wireless communication system according to an aspect of the disclosure. An access point 200 (AP) includes multiple antenna groups, for example, one including 204 and 206, another including 208 and 210, and an additional including 212 and 214. In FIG. 2, only two antennas are shown for each antenna group; however, more or fewer antennas may be utilized for each antenna group. Access terminal 216 (AT) is in communication with antennas 212 and 214, where antennas 212 and 214 transmit information to access terminal 216 over forward link or downlink (DL) 220 and receive information from access terminal 216 over reverse link or uplink (UL) 218. Access terminal 222 is in communication with antennas 206 and 208, where antennas 206 and 208 transmit information to access terminal 222 over forward link or downlink (DL) 226 and receive information from access terminal 222 over reverse link or uplink (UL) 224.

In an aspect of the disclosure, in a frequency division duplexing (FDD) system, communication links 218, 220, 224 and 226 may use different frequency for communication. For example, forward link or downlink (DL) 220 may use a different frequency then that utilized by reverse link or uplink (UL) 218.

In an aspect of the disclosure, each group of antennas and/or the area in which they are designed to communicate may be referred to as a sector of the access point. In an example, each antenna group may be designed to communicate to access terminals in a sector of the areas covered by access point 200.

When communicating over forward links or downlinks (DLs) 220, 226, the transmitting antennas of access point 200 utilize beamforming to improve a signal-to-noise ratio of the forward links or downlinks 220, 226 for the different access terminals 216 and 224, respectively. Also, an access point utilizing beamforming to transmit to access terminals scattered randomly through its coverage causes less interference to access terminals in neighboring cells than an access point transmitting through a single antenna to all its access terminals.

An access point may be a fixed station utilized for communicating with the terminals and may also be referred to as an access point (AP), a Node B (NB), evolved Node B (eNB), or some other terminology. An access terminal may be referred to as an access terminal (AT), user equipment (UE), a wireless communication device, terminal, or some other terminology. Moreover, an access point may be a macrocell access point, femtocell access point, picocell access point, and/or the like.

In various embodiments, as described herein, one or more segments or one or more extension carriers may be linked to a regular carrier resulting in a composite bandwidth over which the UE may transmit information to, and/or receive information from, the eNB.

Figure 3A:
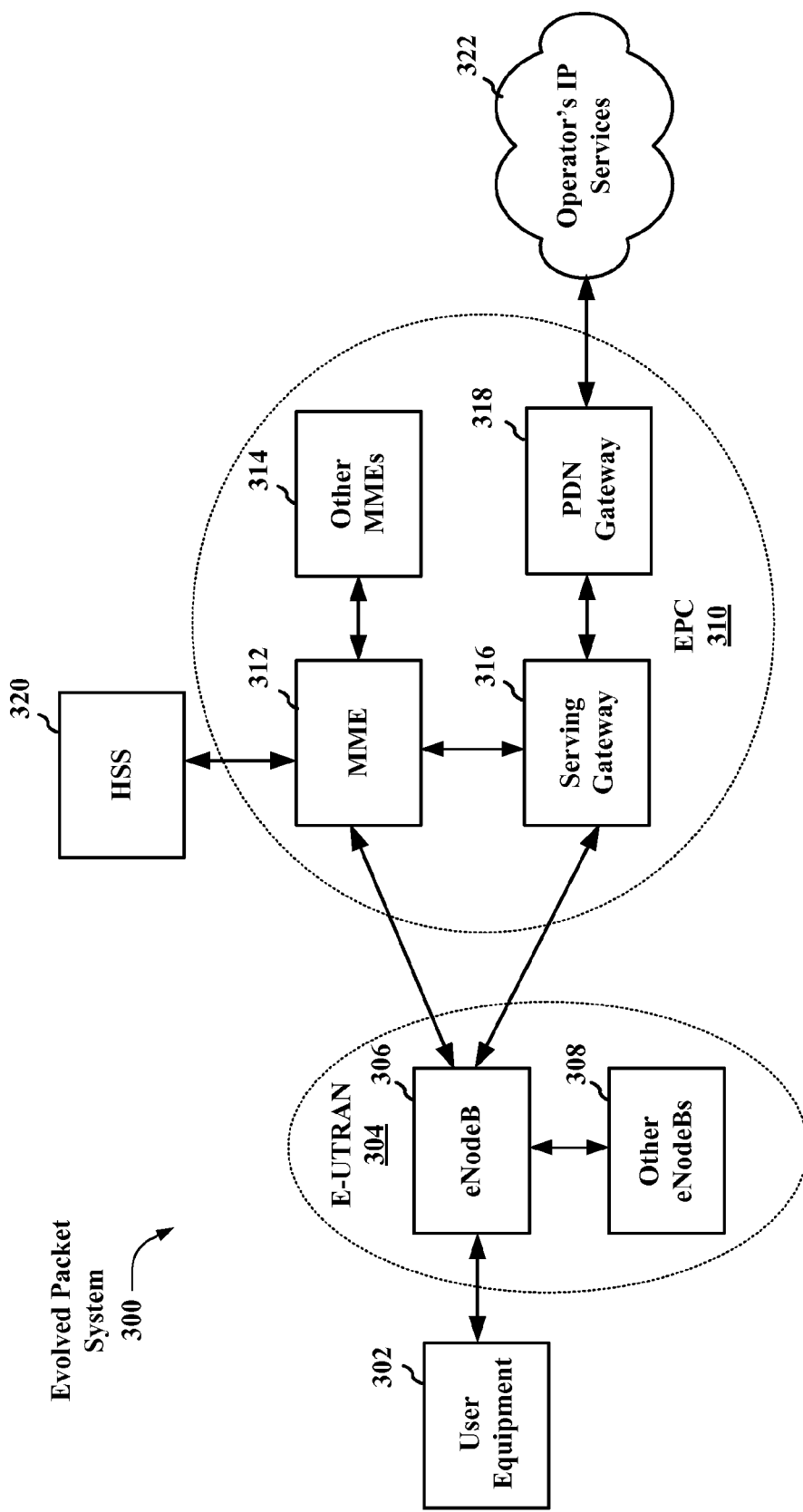
FIG. 3A is a diagram illustrating an example of a network architecture.

FIG. 3A is a diagram illustrating an embodiment of a Long Term Evolution (LTE) network architecture 300. The LTE network architecture 300 may be referred to as an Evolved Packet System (EPS) 300. The EPS 300 may include one or more user equipment (UE) 302, an Evolved UMTS Terrestrial Radio Access Network (E-UTRAN) 304, an Evolved Packet Core (EPC) 310, a Home Subscriber Server (HSS) 320, and an Operator's IP Services 322. The EPS may interconnect with other access networks, but for simplicity, those entities/interfaces are not shown. As shown in FIG. 3A, the EPS 300 provides packet-switched services. However, as those skilled in the art will readily appreciate, the various concepts presented throughout this disclosure may be extended to networks providing circuit-switched services. Further, it should be appreciated that each of the apparatuses and/or devices in the EPS 300 may each comprise the apparatus 100 of FIG. 1, without departing from the scope of the disclosure.

The E-UTRAN includes the evolved Node B (eNB) 306 and/or one or more other eNBs 308. The eNB 306 provides user and control plane protocol terminations toward the UE 302. The eNB 306 may be connected to one or more other eNBs 308 via an X2 interface (i.e., backhaul). The eNB 306 may be referred to by those skilled in the art as a base station, a base transceiver station, a radio base station, a radio transceiver, a transceiver function, a basic service set (BSS), an extended service set (ESS), or some other suitable terminology. The eNB 306 provides an access point to the EPC 310 for a UE 302. Examples of the UE 302 include a cellular phone, a smart phone, a session initiation protocol (SIP) phone, a laptop, a personal digital assistant (PDA), a satellite radio, a global positioning system (GPS), a multimedia device, a video device, a digital audio player (e.g., MP3 player), a camera, a game console, or any other similar functioning device. The UE 302 may be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 306 is connected by an S1 interface to the EPC 310. The EPC 310 includes a Mobility Management Entity (MME) 312, other MMEs 314, a Serving Gateway 316, and a Packet Data Network (PDN) Gateway 318. The MME 312 is the control node that processes the signaling between the UE 302 and the EPC 310. The MME 312 is configured to provide bearer and connection management. User IP packets are transferred through the Serving Gateway 316, which itself is connected to the PDN Gateway 318. The PDN Gateway 318 provides UE Internet Protocol (IP) address allocation and/or other functions. The PDN Gateway 318 is connected to the Operator's IP Services 322. The Operator's IP Services 322 may include the Internet, an intranet, an IP Multimedia Subsystem (IMS), and a PS Streaming Service (PSS).

Figure 3B:
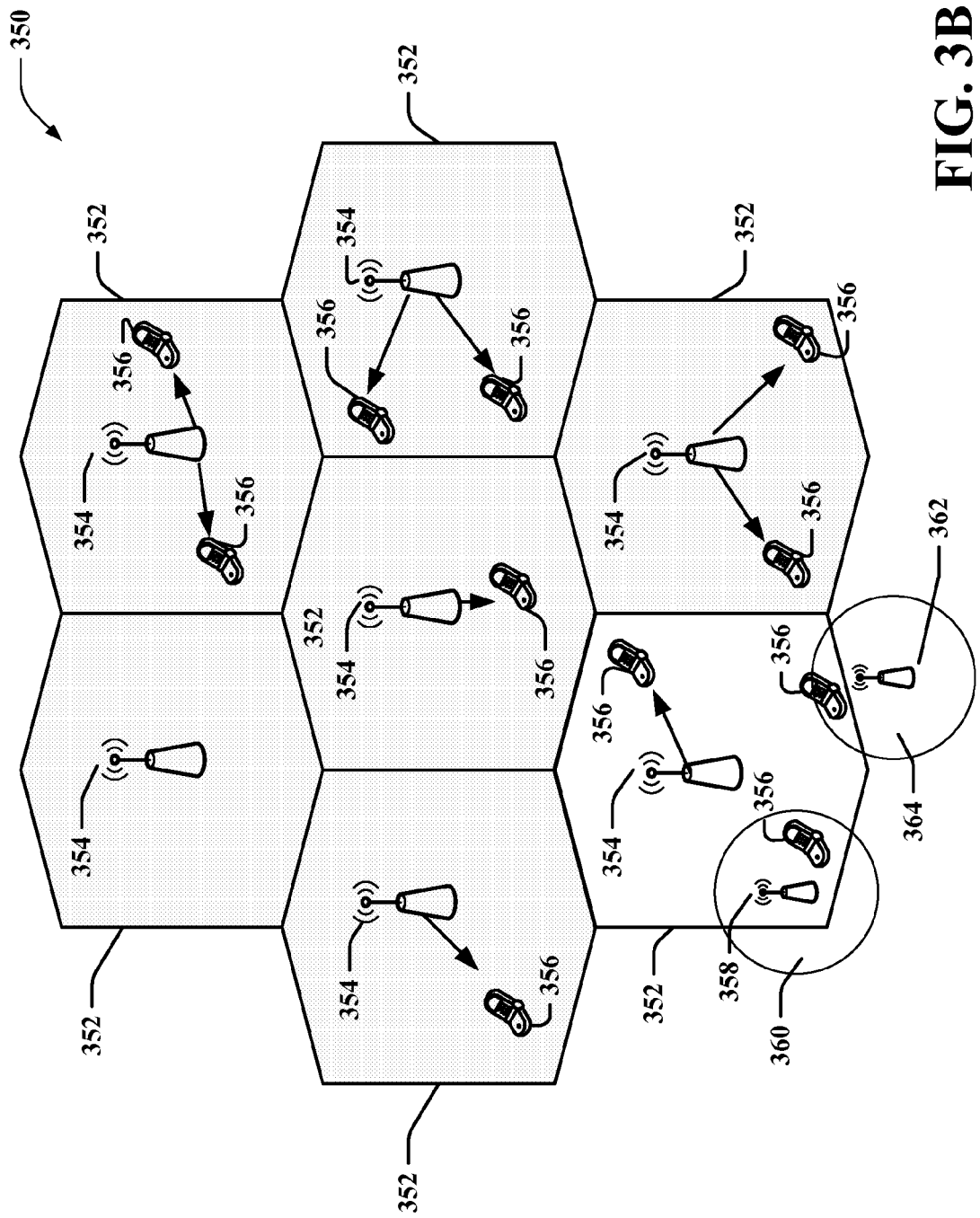
FIG. 3B is a diagram illustrating an example of an access network.

FIG. 3B is a diagram illustrating an example of an access network in an LTE network architecture. In this example, the access network 350 is divided into a number of cellular regions (cells) 352. One or more lower power class eNBs 358, 362 may have cellular regions 360, 364, respectively, that overlap with one or more of the cellular regions or cells 352. The lower power class eNBs 358, 362 may be femto cells (e.g., home eNBs (HeNBs)), pico cells, or micro cells. A higher power class or macro eNB 354 is assigned to a cell 352 and is configured to provide an access point to the EPC 310 for the UEs 356 in the cell 352. Even though there is no centralized controller in this example of the access network 350, a centralized controller may be utilized in alternative configurations. The eNB 354 is responsible for one or more radio related functions including radio bearer control, admission control, mobility control, scheduling, security, and connectivity to the serving gateway 316 (e.g., in FIG. 3A).

The modulation and multiple access scheme utilized by the access network 350 may vary depending on a particular telecommunications standard being deployed. In LTE applications, OFDM is utilized on the downlink (DL) and SC-FDMA is utilized on the uplink (UL) to support both frequency division duplexing (FDD) and time division duplexing (TDD). As those skilled in the art may readily appreciate from the description that follow, the various concepts presented herein are well suited for LTE applications. However, these concepts may be readily extended to various other telecommunication standards utilizing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. It should appreciated that the actual wireless communication standard and the multiple access technology employed will depend on the specific application and the overall design constraints imposed on the system.

In an aspect of the disclosure, the eNB 354 may have multiple antennas supporting MIMO technology. The utilization of MIMO technology enables the eNB 354 to exploit the spatial domain to support spatial multiplexing, beamforming, and transmit diversity.

Spatial multiplexing may be utilized to transmit different streams of data simultaneously on the same frequency. The data steams may be transmitted to a single UE 356 to increase the data rate or to multiple UEs 356 to increase the overall system capacity. This may be achieved by spatially precoding each data stream (i.e., applying a scaling of an amplitude and a phase) and then transmitting each spatially precoded stream through multiple transmit antennas on the downlink. The spatially precoded data streams arrive at the UE(s) 356 with different spatial signatures, which enables each of the UE(s) 356 to recover the one or more data streams destined for that UE 356. On the uplink, each UE 356 transmits a spatially precoded data stream, which enables the eNB 354 to identify the source of each spatially precoded data stream.

Spatial multiplexing is utilized when channel conditions are favorable. When channel conditions are less favorable, beamforming may be utilized to focus transmission energy in one or more directions. This may be achieved by spatially precoding the data for transmission through multiple antennas. To achieve good coverage at the edges of a cell, a single stream beamforming transmission may be utilized in combination with transmit diversity.

In the description that follows, various aspects of an access network will be described with reference to a MIMO system supporting OFDM on downlink (DL) and SC-FDMA on uplink (UL). OFDM is a spread-spectrum technique that modulates data over a number of subcarriers within an OFDM symbol. The subcarriers are spaced apart at precise frequencies. The spacing provides "orthogonality" that enables a receiver to recover data from subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4A:
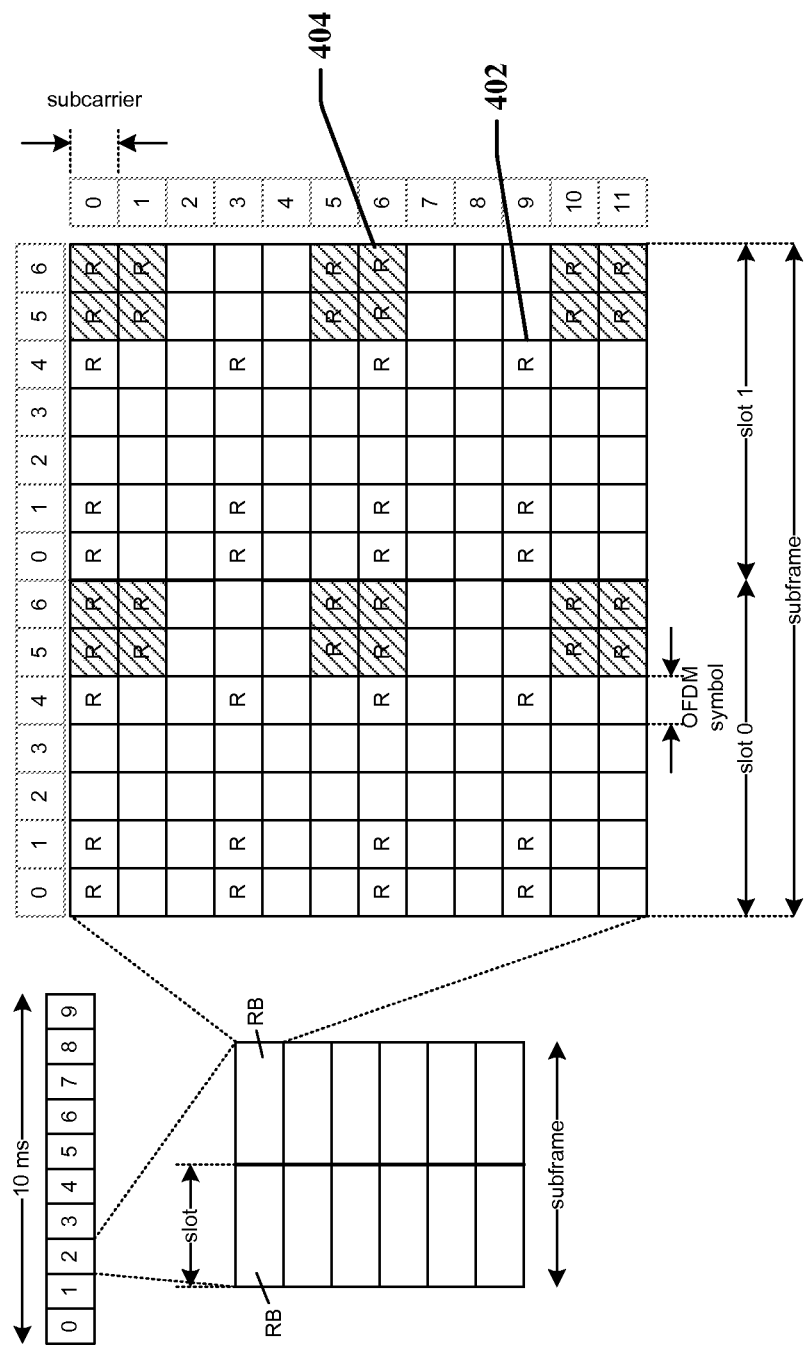
FIG. 4A is a diagram illustrating an example of a frame structure for use in an access network.

In an aspect of the disclosure, various frame structures may be utilized to support downlink (DL) and uplink (UL) transmissions. In accordance with an aspect of the disclosure, an example of a DL frame structure will now be presented with reference to FIG. 4A. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

In an aspect of the disclosure, a resource grid may be utilized to represent two time slots, each time slot including a Resource Block (RB). The resource grid is divided into multiple Resource Elements (REs). In LTE, a Resource Block (RB) may include 12 consecutive subcarriers in the frequency domain and, for a normal cyclic prefix in each OFDM symbol, 7 consecutive OFDM symbols in the time domain, or 84 Resource Elements (REs). Some of the REs, as indicated as R 402 and 404, may include DL Reference Signals (DL-RS). The DL-RS include Cell-specific RS (CRS) (which may be referred to as common RS) 402 and UE-specific RS (UE-RS) 404. UE-RS 404 may be transmitted only on the RBs upon which a corresponding Physical Downlink Shared CHannel (PDSCH) is mapped. The number of bits carried by each RE may depend on the modulation scheme. As such, the more RBs that a UE receives and the higher the modulation scheme, the higher the data rate for the UE.

Figure 4B:
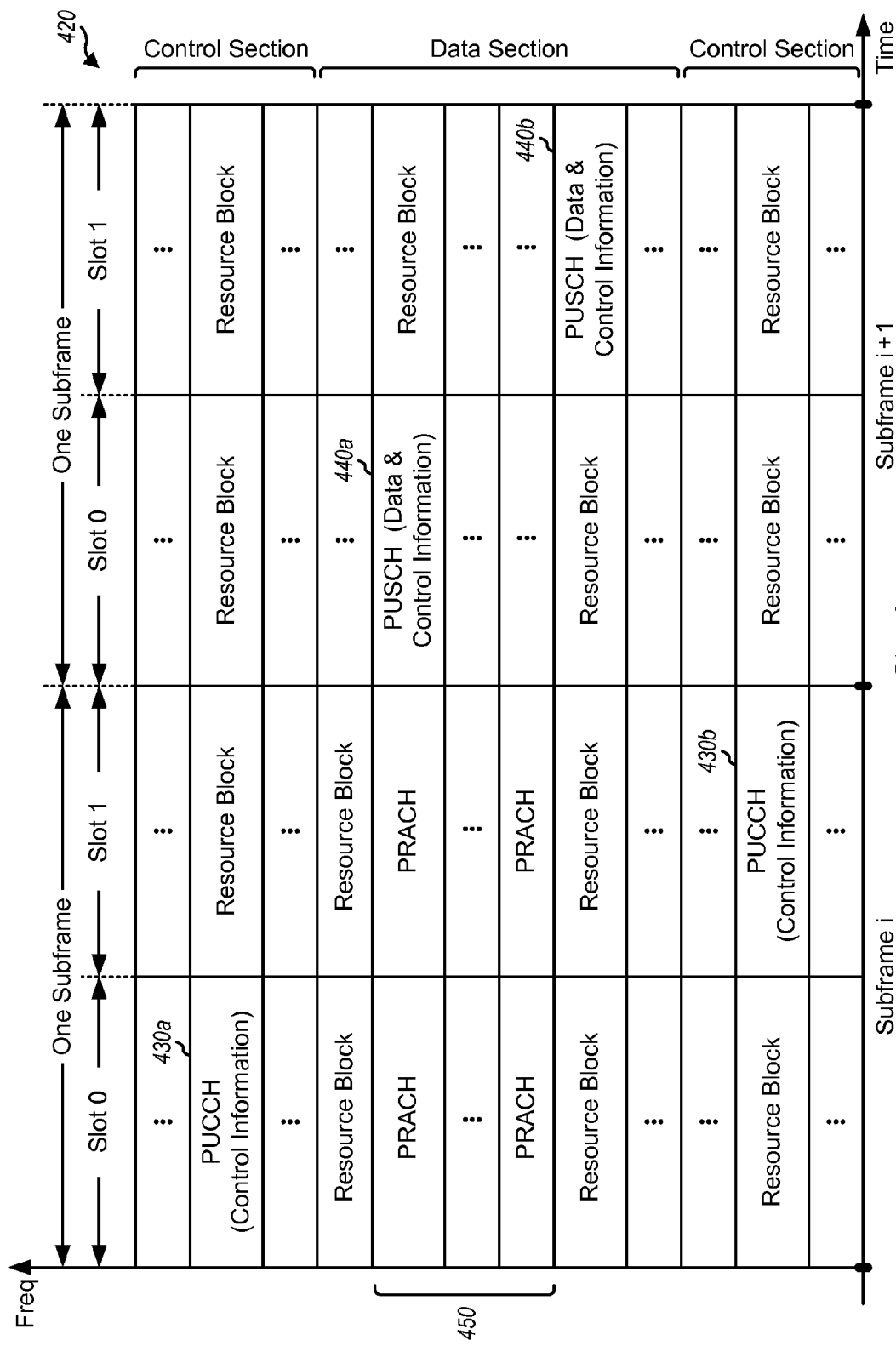
FIG. 4B shows an exemplary format for the uplink (UL) in LTE.

In accordance with an aspect of the disclosure, an example of a UL frame structure 420 is provided with reference to FIG. 4B. FIG. 4B shows an embodiment of a format for the UL in LTE. Available Resource Blocks (RBs) for the UL may be partitioned into a data section and a control section. The control section may be formed at the two edges of the system bandwidth and may have a configurable size. The RBs in the control section may be assigned to UEs for transmission of control information. The data section may include RBs not included in the control section. The design in FIG. 4B results in the data section including contiguous subcarriers, which may allow a single UE to be assigned one or more of the contiguous subcarriers in the data section.

In an implementation, a UE may be assigned Resource Blocks (RBs) 430*a*, 430*b* in a control section to transmit control information to an eNB. The UE may be assigned RBs 440*a*, 440*b* in a data section to transmit data to the eNB. The UE may transmit control information in a Physical Uplink Control CHannel (PUCCH) on the assigned RBs in the control section. The UE may transmit only data or both data and control information in a Physical Uplink Shared CHannel (PUSCH) on the assigned RBs in the data section. A UL transmission may span both slots of a subframe and may hop across frequency, in a manner as shown in FIG. 4B.

Referring to FIG. 4B, a set of Resource Blocks (RBs) may be utilized to perform initial system access and achieve uplink (UL) synchronization in a Physical Random Access CHannel (PRACH) 450. In an aspect of the disclosure, the PRACH 450 is configured to carry a random sequence and cannot carry any UL data/signaling. Each random access preamble occupies bandwidth corresponding to six consecutive RBs. The starting frequency may be specified by the network. That is, the transmission of the random access preamble is restricted to certain time and frequency resources. There is no frequency hopping for the PRACH. The PRACH attempt is carried in a single subframe (1 ms), and a UE may make only a single PRACH attempt per frame (10 ms).

It should be appreciated that the PUCCH, PUSCH, and PRACH in LTE are described in reference to 3GPP TS 36.211, entitled "Evolved Universal Terrestrial Radio Access (E-UTRA); Physical Channels and Modulation," which is publicly available.

The radio protocol architecture may take on various forms depending on the particular application. An example for an LTE system will now be presented with reference to FIG. 4C. In accordance with an aspect of the disclosure, FIG. 4C is a conceptual diagram illustrating an example of the radio protocol architecture for the user and control planes.

Figure 4C:
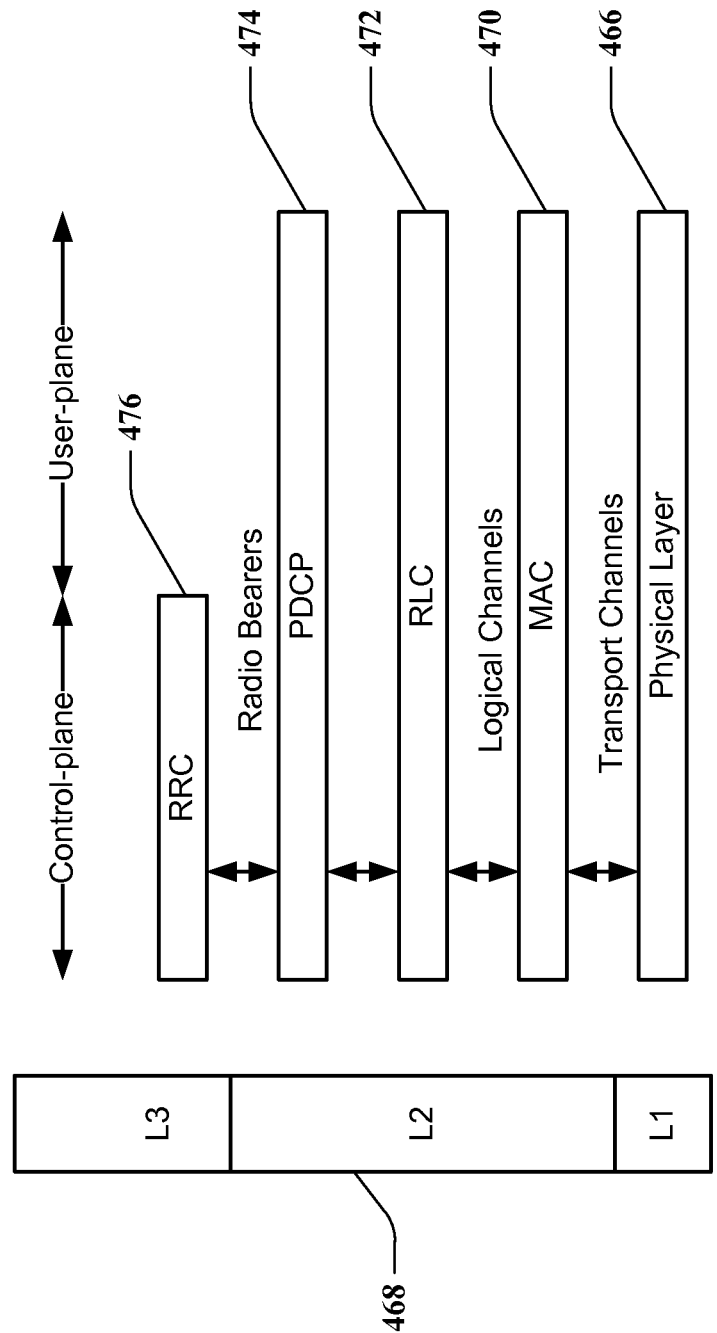
FIG. 4C is a diagram illustrating an example of a radio protocol architecture for the user and control plane.

Turning to FIG. 4C, the radio protocol architecture for the UE and the eNB is shown with three layers: Layer 1 (L1), Layer 2 (L2), and Layer 3 (L3). L1 is the lowest layer and implements various physical layer signal processing functions. L1 is referred to herein as a physical layer 466. L2 468 is above the physical layer (L1) 466 and is responsible for the link between the UE and eNB over the physical layer (L1) 466.

In the user plane, the L2 layer 468 includes a media access control (MAC) sublayer 470, a radio link control (RLC) sublayer 472, and a Packet Data Convergence Protocol (PDCP) 474 sublayer, which are terminated at the eNB on the network side. Although not shown, the UE may have several upper layers above the L2 layer 468 including a network layer (e.g., IP layer) that is terminated at the PDN gateway 318 (e.g., see FIG. 3A) on the network side, and an application layer that is terminated at the other end of the connection (e.g., far end UE, server, etc.).

The PDCP sublayer 474 provides multiplexing between different radio bearers and logical channels. The PDCP sublayer 474 may provide header compression for upper layer data packets to reduce radio transmission overhead, security by ciphering the data packets, and/or handover support for UEs between eNBs. The RLC sublayer 472 provides segmentation and reassembly of upper layer data packets, retransmission of lost data packets, and/or reordering of data packets to compensate for out-of-order reception due to Hybrid Automatic Repeat Request (HARQ). The MAC sublayer 470 provides multiplexing between logical and transport channels, and the MAC sublayer 470 is responsible for allocating the various radio resources (e.g., RBs) in one cell among the UEs. The MAC sublayer 470 is responsible for HARQ operations.

In the control plane, the radio protocol architecture for the UE and eNB is substantially the same for the physical layer 466 and the L2 layer 468 with the exception that there is no header compression function for the control plane. The control plane includes a Radio Resource Control (RRC) sublayer 476 in Layer 3. The RRC sublayer 476 is responsible for obtaining radio resources (i.e., radio bearers) and for configuring the lower layers utilizing RRC signaling between the eNB and the UE.

Figure 5:
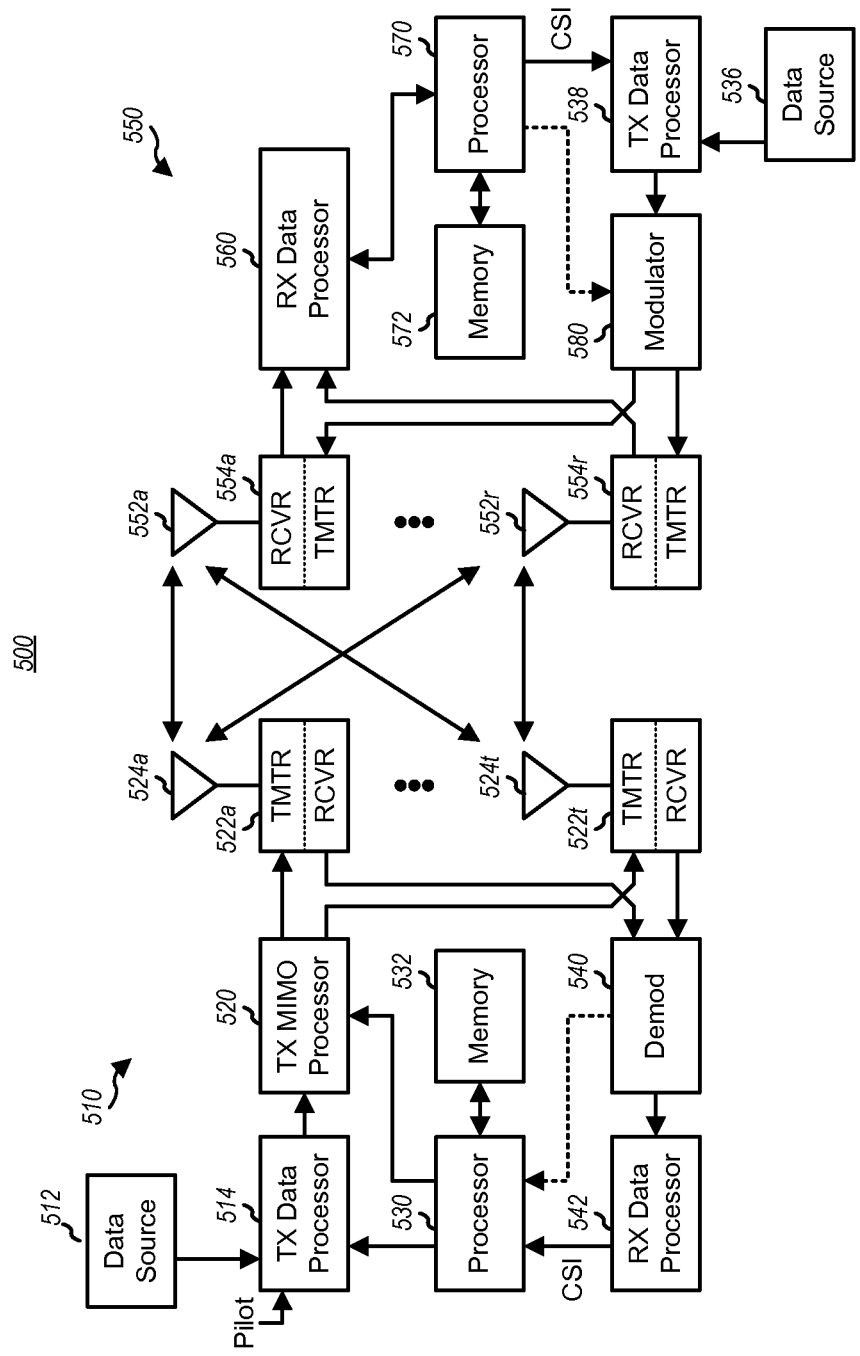
FIG. 5 illustrates a block diagram of a communication system, in accordance with an embodiment of the disclosure.

In accordance with an aspect of the disclosure, FIG. 5 is a block diagram of an embodiment of a transmitter system 510 (e.g., an access point (AP)) and a receiver system 550 (e.g., an access terminal (AT)) in a MIMO system 500. At the transmitter system 510, traffic data for a number of data streams is provided from a data source 512 to a transmit (TX) data processor 514. Each data stream may be transmitted over a respective transmit antenna, and the TX data processor 514 may format, code, and interleave the traffic data for each data stream based on a particular coding scheme selected for that data stream to provide coded data.

The coded data for each data stream may be multiplexed with pilot data utilizing Orthogonal Frequency Division Multiplexing (OFDM) techniques. The pilot data is typically a known data pattern that is processed in a known manner and may be utilized at the receiver system to estimate the channel response. The multiplexed pilot and coded data for each data stream is then modulated (i.e., symbol mapped) based on a particular modulation scheme (e.g., Binary Phase-Shift Keying (BPSK), Quadrature Phase-Shift Keying (QPSK), M-Phase-Shift Keying (M-PSK), M-Quadrature Amplitude Modulation (M-QAM)) selected for that data stream to provide modulation symbols. The data rate, coding, and modulation for each data stream may be determined by instructions performed by processor 530.

The modulation symbols for all data streams are then provided to a TX MIMO processor 520, which may further process the modulation symbols (e.g., for OFDM). TX MIMO processor 520 then provides $N_T$ modulation symbol streams to $N_T$ transmitters (TMTR) 522a through 522t. In certain embodiments, TX MIMO processor 520 applies beamforming weights to the symbols of the data streams and to the antenna from which the symbol is being transmitted.

Each transmitter 522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Each receiver 554 conditions (e.g., filters, amplifies, and/or down-converts) a respective received signal, digitizes the conditioned signal to provide samples, and further processes the samples to provide a corresponding "received" symbol stream.

An RX data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves, and decodes each detected symbol stream to recover the traffic data for the data stream. The processing by RX data processor 560 is complementary to that performed by TX MIMO processor 520 and TX data processor 514 at transmitter system 510. A processor 570 is configured to periodically determine which pre-coding matrix to use (discussed below). Processor 570 formulates a reverse link or UL message comprising a matrix index portion and a rank value portion.

The reverse link or UL message may comprise various types of information regarding the communication link and/or the received data stream. The reverse link or uplink (UL) message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reverse link or uplink (UL) message transmitted by the receiver system 550. Processor 530 then determines which pre-coding matrix to use for determining the beamforming weights then processes the extracted message.

In an aspect, logical channels are classified into Control Channels and Traffic Channels. Logical Control Channels comprises Broadcast Control Channel (BCCH), which is downlink (DL) channel for broadcasting system control information. Paging Control Channel (PCCH), which is DL channel that transfers paging information. Multicast Control Channel (MCCH), which is point-to-multipoint DL channel utilized for transmitting Multimedia Broadcast and Multicast Service (MBMS) scheduling and control information for one or several MTCHs. Generally, after establishing RRC connection, this channel is only utilized by UEs that receive MBMS (Note: old MCCH+MSCH). Dedicated Control Channel (DCCH) is point-to-point bi-directional channel that transmits dedicated control information and utilized by UEs having an RRC connection. Logical Traffic Channels comprise a Dedicated Traffic Channel (DTCH), which is point-to-point bi-directional channel, dedicated to one UE, for the transfer of user information. Also, a Multicast Traffic Channel (MTCH) for point-to-multipoint DL channel for transmitting traffic data.

In an aspect of the disclosure, Transport Channels may be classified into downlink (DL) and uplink (UL). DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which may be utilized for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect of the disclosure, a channel structure is provided that preserves low PAR (at any given time, the channel is contiguous or uniformly spaced in frequency) properties of a single carrier waveform.

For the purposes of the disclosure, the following abbreviations apply:
ACK Acknowledgement
AM Acknowledged Mode
AMD Acknowledged Mode Data
AMR Adaptive Multi-Rate
ARQ Automatic Repeat Request
BCCH Broadcast Control CHannel
BCH Broadcast Channel
BPSK Binary Phase-Shift Keying
BW Bandwidth
C-Control-
CCE Control Channel Element
CCCH Common Control CHannel
CCH Control CHannel
CCTrCH Coded Composite Transport Channel
CDM Code Division Multiplexing
CP Cyclic Prefix
CQI Channel Quality Indicator
CRC Cyclic Redundancy Check
CRS Common Reference Signal
CTCH Common Traffic CHannel
DCCH Dedicated Control CHannel
DCH Dedicated CHannel
DCI Downlink Control Information
DL DownLink
DL-SCH Downlink Shared CHannel
DRS Dedicated Reference Signal
DSCH Downlink Shared CHannel
DTCH Dedicated Traffic CHannel
E-CID Enhanced Cell IDentification
EPS Evolved Packet System
FACH Forward link Access CHannel
FDD Frequency Division Duplex
FDM Frequency Division Multiplex
FSTD Frequency Switched Transmit Diversity
HARQ Hybrid Automatic Repeat/reQuest
L1 Layer 1 (physical layer)
L2 Layer 2 (data link layer)
L3 Layer 3 (network layer)
LI Length Indicator
LLR Log-Likelihood Ratio
LSB Least Significant Bit
MAC Medium Access Control
MBMS Multimedia Broadcast Multicast Service
MBSFN Multicast Broadcast Single Frequency Network
MCCH MBMS point-to-multipoint Control Channel
MCH Multicast Channel
M-PSK M-Phase-Shift Keying
M-QAM M-Quadrature Amplitude Modulation
MRW Move Receiving Window
MSB Most Significant Bit
MSCH MBMS point-to-multipoint Scheduling CHannel
MTCH MBMS point-to-multipoint Traffic CHannel
NAK Non-Acknowledgement
OFDM Orthogonal Frequency Division Multiplexing
PA Power Amplifier
PCCH Paging Control CHannel
PCH Paging CHannel
PCI Physical Cell Identifier
PDCCH Physical Downlink Control Channel
PCFICH Physical Control Format Indicator CHannel
PDSCH Physical Downlink Shared CHannel
PHICH Physical HARQ Indicator Channel
PDU Protocol Data Unit
PHY PHYsical layer
PhyCH Physical CHannels
PMI Precoding Matrix Indicator
PRACH Physical Random Access CHannel
PSS/SSS Primary/Secondary Synchronization Signals
PUCCH Physical Uplink Control CHannel
PUSCH Physical Uplink Shared Channel
QPSK Quadrature Phase-Shift Keying
R- Relay
RACH Random Access CHannel
RB Resource Block
RLC Radio Link Control
RRC Radio Resource Control
RE Resource Element
R-PDCCH Relay-Physical Downlink Control CHannel
R-PHICH Relay-Physical HARQ Indicator CHannel
RS Reference Signal
RTT Round Trip Time
Rx Receive
SAP Service Access Point
SDU Service Data Unit
SFBC Space Frequency Block Code
SHCCH SHared channel Control CHannel
SINR Signal-to-Interference-and-Noise Ratio
SN Sequence Number
SR Scheduling Request
SRS Sounding Reference Signal
SU-MIMO Single User Multiple Input Multiple Output
SUFI SUper FIeld
TA Timing Advance
TCH Traffic CHannel
TDD Time Division Duplex
TDM Time Division Multiplex
TFI Transport Format Indicator
TPC Transmit Power Control
TTI Transmission Time Interval
Tx Transmit
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network In accordance with aspects of the disclosure, the systems, apparatus, and methods described herein may be employed to facilitate transmission of Relay-Physical Hybrid automatic repeat request Indicator CHannels (R-PHICHs). Resource Element (RE) locations for transmission of R-PHICHs may be signaled through Layer 3 (L3) or dynamically linked to a first Resource Block (RB) of the UL data transmission as in LTE Release 8. For example, a Base Station (BS) may signal different amounts of resource to be reserved for R-PHICH and thereby allow the BS to adapt transmission of R-PHICH for different applications. For example, in some embodiments, the BS may signal an amount indicative of zero resource to be reserved for R-PHICH. In this embodiment, there is no R-PHICH transmission.

In an aspect of the disclosure, the R-PHICH may be semi-statically configured with one of the embodiments described herein. For example, if the number of UEs or relay nodes is small, puncturing may be utilized to transmit the R-PHICH, such as that described below with reference to FIG. 7A. Otherwise, when the number of UEs or relay nodes is not small, the R-PHICH may be transmitted according to the methods described below with reference to FIG. 9.

In accordance with one or more aspects of the disclosure, puncturing refers to the mapping of symbols and/or sequences of a first signal and/or channel to one or more Resource Elements (REs) being utilized by a second signal and/or channel, where the second signal and/or channel may or may not be aware of a puncturing operation. As such, if the second signal and/or channel is not aware of the puncturing operation, then the second signal and/or channel may still assume that the one or more REs carry the symbols and/or sequences for itself.

Alternatively, a rate-matching operation can be performed, where the second signal and/or channel assumes that the one or more REs utilized by the first signal and/or channel are not available for itself. Therefore, when the symbols and/or sequences of the second signal and/or channel are mapped, the one or more REs utilized by the first signal and/or channel may be excluded from the mapping operation.

Figure 6:
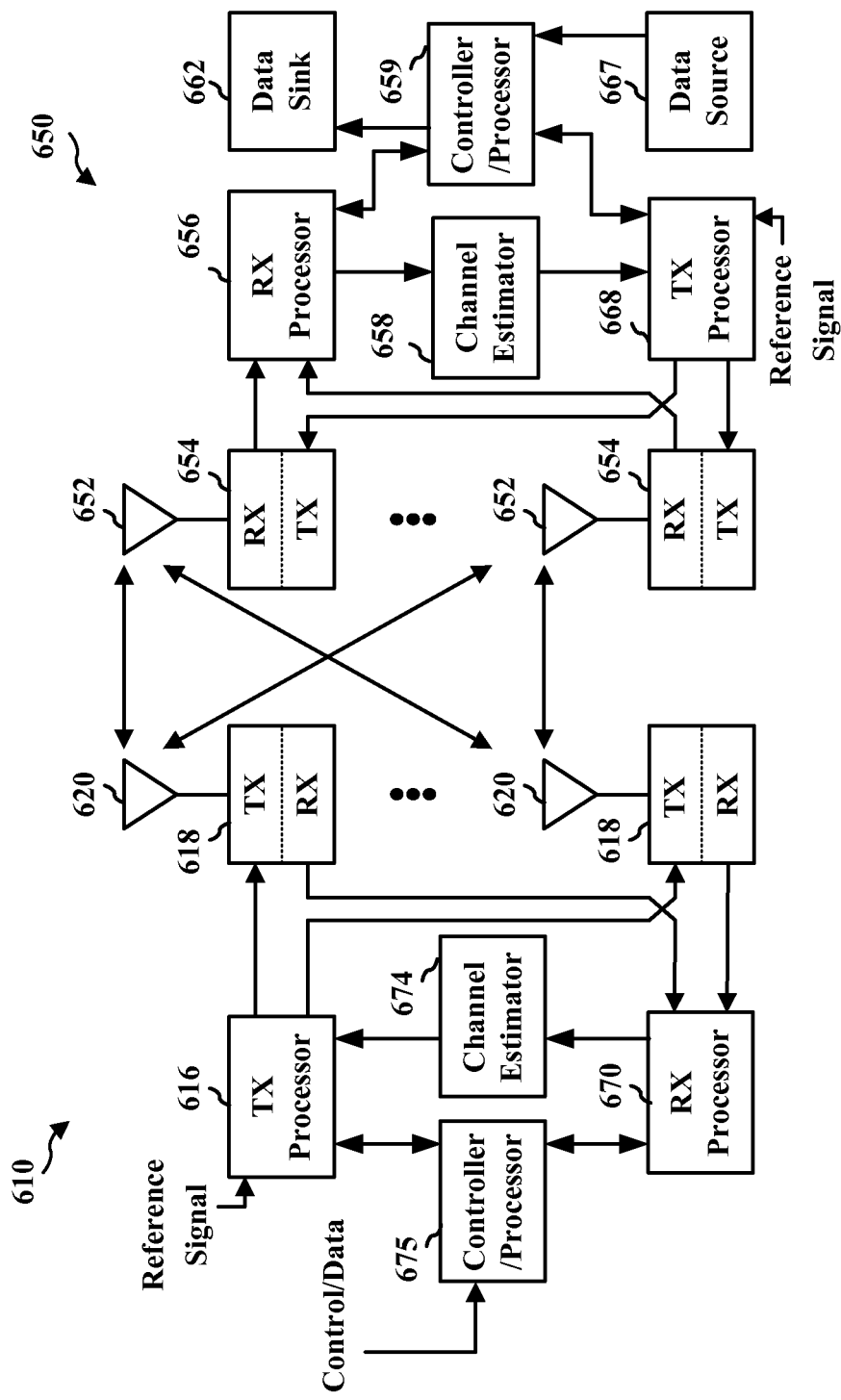
FIG. 6 is a diagram illustrating an example of an evolved Node B (eNB) and user equipment (UE) in an access network.

In accordance with an aspect of the disclosure, FIG. 6 is a block diagram of an eNB 610 in communication with a UE 650 in an access network. In the DL, upper layer packets from the core network are provided to a controller/processor 675. The controller/processor 675 implements the functionality of the L2 layer described herein with reference to FIG. 6. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., Binary Phase-Shift Keying (BPSK), Quadrature Phase-Shift Keying (QPSK), M-Phase-Shift Keying (M-PSK), M-Quadrature Amplitude Modulation (M-QAM)). The coded and modulated symbols are then split into parallel streams. Each stream is then mapped to an OFDM subcarrier, multiplexed with a reference signal (e.g., pilot) in the time and/or frequency domain, and then combined together utilizing an Inverse Fast Fourier Transform (IFFT) to produce a physical channel carrying a time domain OFDM symbol stream. The OFDM stream is spatially precoded to produce multiple spatial streams.

Channel estimates from a channel estimator 674 may be utilized to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission. At the UE 650, each receiver 654RX receives a signal through its respective antenna 652. Each receiver 654RX recovers information modulated onto an RF carrier and provides the information to the receiver (RX) processor 656.

The RX processor 656 is configured to implement various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain utilizing a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to a controller/processor 659.

The controller/processor 659 implements the L2 layer described earlier in connection with FIG. 4C. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. In accordance with aspects of the disclosure, the controller/processor 659 is responsible for error detection utilizing a positive acknowledgement (ACK) and/or negative acknowledgement (NAK) protocol to support HARQ operation including, for example, Physical HARQ Indicator CHannel (PHICH) operation.

In the UL, a data source 667 is utilized to provide upper layer packets to the controller/processor 659. The data source 667 represents all protocol layers above the L2 layer (L2). Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be utilized by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 implements the L1 layer.

In one aspect of the disclosure, the controller/processor 659 is configured to implement the L2 layer described herein with reference to FIG. 4C. In the UL, the control/processor 659 provides demultiplexing between transport and logical channels, packet reassembly, deciphering, header decompression, control signal processing to recover upper layer packets from the UE 650. Upper layer packets from the controller/processor 675 may be provided to the core network. The controller/processor 659 is also responsible for error detection utilizing an ACK and/or NAK protocol to support HARQ operations.

In one embodiment of the disclosure, the processing system 114 described in relation to FIG. 1 may include the eNB 610. As such, the processing system 114 may include the TX processor 616, the RX processor 670, and the controller/processor 675.

In another embodiment of the disclosure, the processing system 114 described in relation to FIG. 1 may includes the UE 650. As such, the processing system 114 may include the TX processor 668, the RX processor 656, and the controller/processor 659.

Figure 7A:
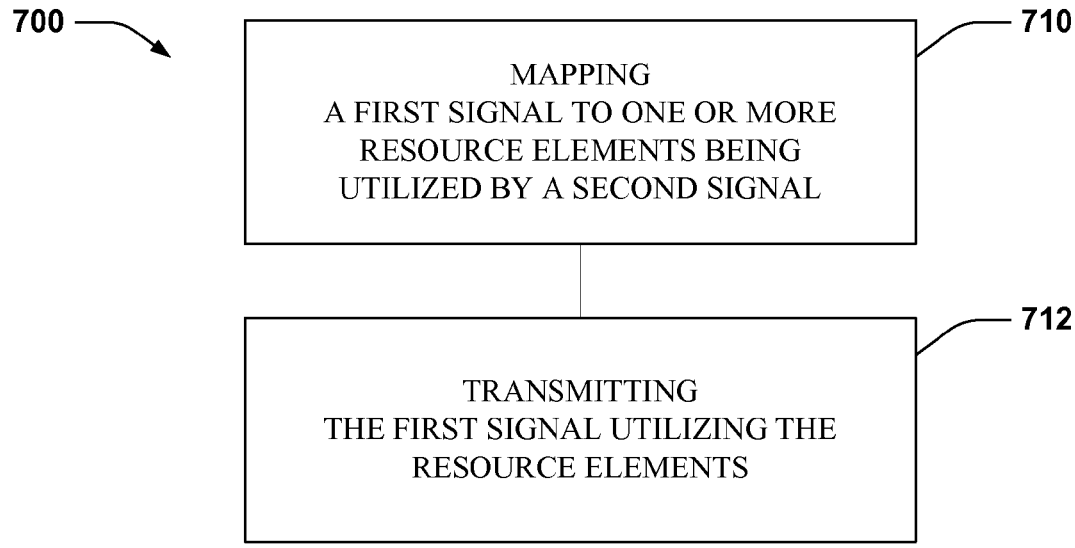
FIGS. 7A and 7B illustrate flowcharts of embodiments of methods for facilitating transmission of acknowledgement signals, in accordance with aspects of the disclosure.
Figure 7B:
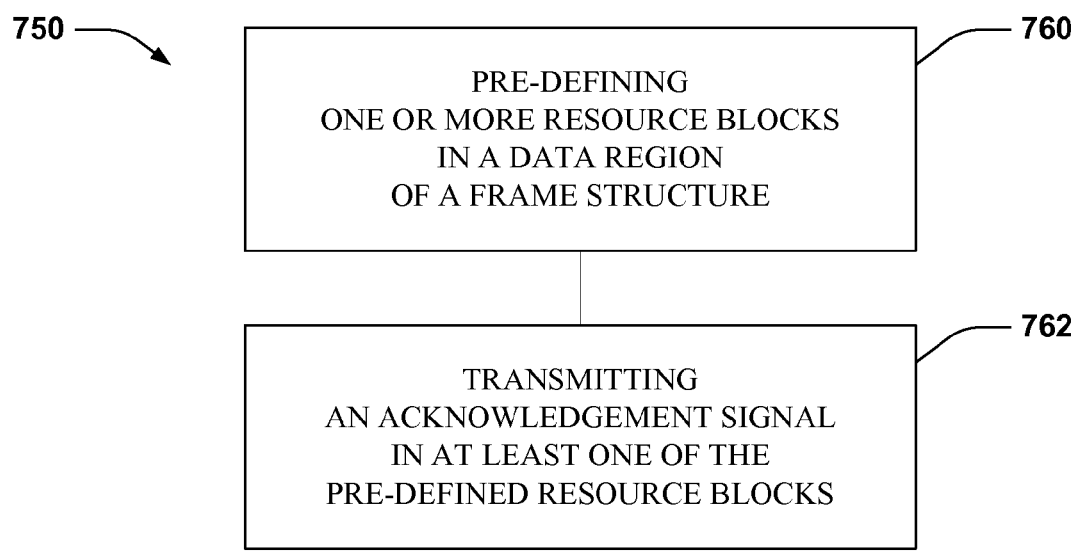

In accordance with aspects of the disclosure, FIGS. 7A and 7B are flowcharts of methods for facilitating transmission of acknowledgement signals, such as, for example, Relay-Physical HARQ Indicator Channels (R-PHICHs), in a wireless communication system such as, for example, an LTE or an LTE-A wireless communication system. As described herein, HARQ refers to Hybrid Automatic Repeat/reQuest. In an aspect of the disclosure, the methods 700 and 750 of FIGS. 7A and 7B, respectively, may be employed for transmission of R-PHICH in embodiments wherein the R-PHICH is not multiplexed with the Relay-Physical Downlink Control Channel (R-PDCCH) in a manner as performed, for example, in LTE Release 8. For instance, R-PHICH is not introduced in Release 10 along with R-PDCCH (but may be introduced in a later LTE release) and/or R-PHICH may be utilized over the air for providing improved interference protection for UEs.

In accordance with aspects of the disclosure, methods 700 and 750 of FIGS. 7A and 7B, respectively, may facilitate transmission of acknowledgement signals (e.g., R-PHICH, HARQ-ACK, HARQ-NAK, etc.) by employing methods utilizing puncturing, pre-defined RBs, and/or transmission similar to that provided for R-PDCCH, respectively.

Referring to FIG. 7A, method 700 may be employed to facilitate transmission of acknowledgement signals by employing methods utilizing, at 710, mapping a first signal to one or more Resource Elements (REs) being utilized by a second signal and, at 712, transmitting the first signal utilizing the Resource Elements (REs). In an implementation, the first signal is associated with an acknowledgement signal.

For example, in an implementation, method 700 may be employed to facilitate transmission of R-PHICH by employing methods utilizing puncturing of the REs in the data region of a frame structure. In particular, method 700 may include puncturing one or more REs in a data region of a frame structure, and method 700 may include transmitting an R-PHICH in the one or more punctured REs.

In another example, the R-PHICH may puncture REs in the region associated with the R-PDSCH region and/or the R-PDCCH region. Generally, R-type channels are better protected from interference than regular PDSCH, and R-PHICH may benefit from reasonable interference protection.

In another example, the R-PHICH may puncture REs in the region associated with the demodulation reference signal (DM-RS) REs for one or more PDSCH or R-PDSCH. For instance, an R-PDSCH transmitter may be informed with 24 DM-RS REs, and only 12 REs are utilized by itself, while the other 12 REs are transparent to the UE. The other 12 REs that are transparent to the UE may be utilized for R-PHICH transmission.

In any embodiment, the puncturing may be designed such that the impact on R-PDCCH and R-PDSCH is minimized. In some embodiments, the number of REs punctured for R-PHICH transmission per RB may be minimized In some embodiments, the Release-8 PHICH transmission structure may be reutilized. As such, the R-PHICH may be distributed in frequency and time with three clusters (e.g., 3 REGs). The multiplexing may be performed in a number of different ways. For example, utilizing the approach of Release 8, in one embodiment, a Walsh code may be employed to multiplex different UEs in the frequency domain within one OFDM symbol and one cluster (e.g., 1 REG).

As another example, going beyond the approach of Release 8, instead of applying Walsh codes over the frequency domain (e.g., the same OFDM symbol) as in Release 8, Walsh codes may be applied in the time domain. As such, the impact of puncturing may be spread over different code blocks of PDSCH. In various embodiments, the R-PHICH may be spread over different OFDM symbols or multiplexed over time and frequency domains.

Another embodiment of puncturing may include transmitting additional DM-RS together with R-PHICH for detecting of R-PHICH.

Referring to FIG. 7B, method 750 may be employed to facilitate transmission of acknowledgement signals by employing methods utilizing, at 760, pre-defining one or more Resource Blocks (RBs) in a data region of a frame structure and, at 762, transmitting an acknowledgement signal in at least one of the pre-defined Resource Blocks (RBs).

For example, in an implementation, method 750 may be employed to facilitate transmission of R-PHICH by employing methods utilizing pre-defined Resource Blocks (RBs). In particular, method 750 may include pre-defining one or more RBs in a data region of a frame structure, and method 750 may include transmitting an R-PHICH in at least one of the pre-defined RBs. In one example, the R-PHICH may be transmitted in one or more pre-defined RBs through layer 3 (L3) signaling. For instance, the Release 8 UL PUCCH structure may be reutilized in the downlink (DL). Further, on another example, instead of utilizing Zadoff-Chu (ZC) sequences, a different BS may be utilized to multiplex different UEs. In some embodiments, the pre-defined RBs are in at least one of a Relay-Physical Downlink Control CHannel (R-PDCCH) region or a Relay-Physical Downlink Shared CHannel (R-PDSCH) region.

Other methods may be employed to facilitate transmission of R-PHICH by utilizing bundling the R-PHICH with the R-PDCCH. For example, a method may include the R-PHICH being embedded in the DL R-PDCCH for the same UE.

As another example, a method may include the R-PHICH being embedded in the scrambling R-PDCCH cyclic redundancy check (CRC) for the same UE.

Figure 8A:
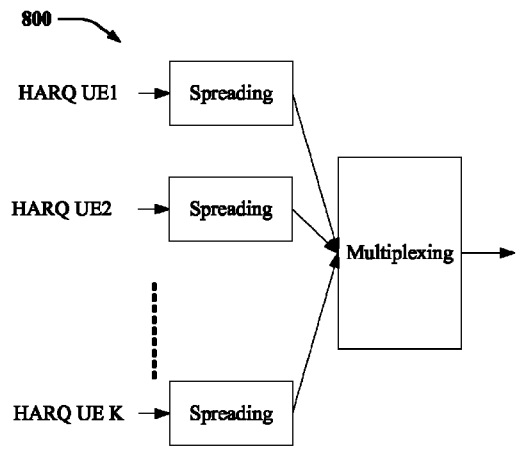
FIGS. 8A and 8B illustrate block diagrams for facilitating transmission of acknowledgement signals, in accordance with aspects of the disclosure.
Figure 8B:
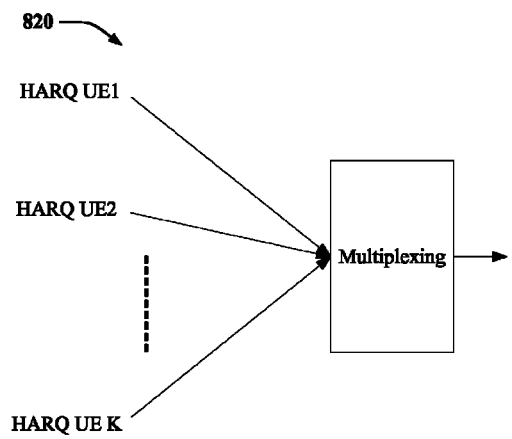

FIGS. 8A and 8B illustrate block diagrams for facilitating transmission of acknowledgement signals (e.g., R-PHICH, HARQ-ACK, HARQ-NAK, etc.) according to embodiments described herein. One R-PDCCH may carry one R-PHICH for a group of UEs, similar to the downlink control information (DCI) formats 3 and 3A in LTE. In an embodiment, FIGS. 8A and 8B illustrate processing systems 800, 820, respectively, for facilitating such transmission. The processing systems 800, 820 may be provided in a BS transmitting the R-PHICH on a DL to a UE. The processing systems 800, 820 may utilize a wireless communication component, such as a transceiver, transmitter, etc., to transmit the R-PHICH on a DL to a UE.

With reference to FIG. 8A, similar to the DCI 3 and 3A formats, each UE may be assigned a location (e.g., one or more bits), and the bit value may indicate a positive acknowledgement (ACK) or a negative acknowledgement (NAK). In an aspect, an activity factor (similar to the voice activity factor) of the UEs may be utilized as follows. Each HARQ ACK/NAK payload may be spread with spreading codes, and then be multiplexed with other HARQ ACK/NAK payloads for other UEs. This approach may be more efficient than the approach in FIG. 8B.

With reference to FIG. 8B, similar to the DCI 3 and 3A formats, each UE may be assigned a location, and the bit value may indicate an ACK or NAK. Even with only active UEs, the entire DCI may still need to transmitted, and thus, the solution may be inefficient. The new DCI format may be standalone or size-matched with one or more existing DCI formats. In some embodiments, the DCI format may or may not have a Cyclic Redundancy Check (CRC).

Figure 9:
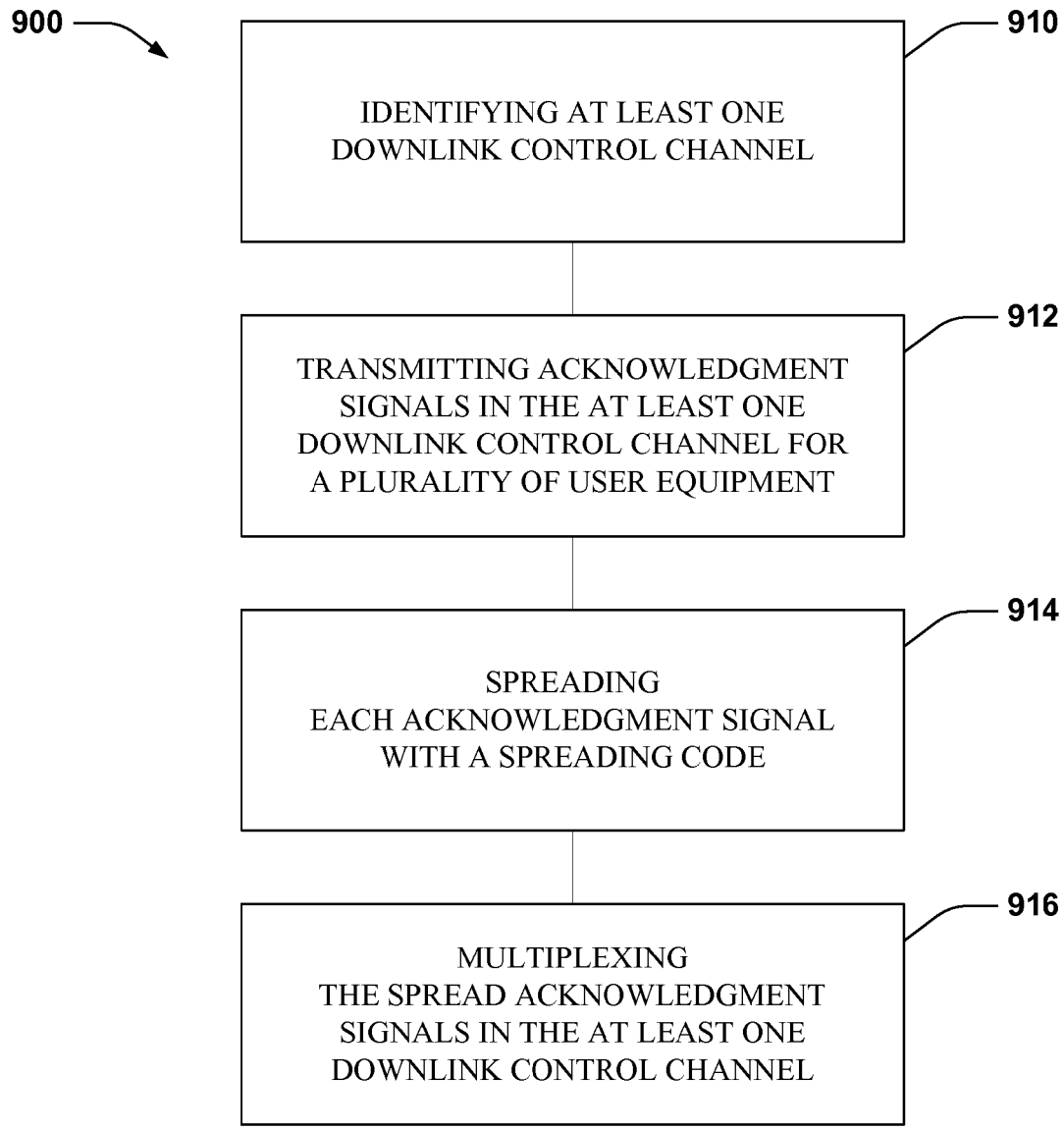
FIG. 9 illustrates a flowchart of a method for facilitating transmission of acknowledgement signals, in accordance with aspects of the disclosure.

One embodiment of performing a method utilizing the processing system 800 for the method of FIG. 8A may be as shown in FIG. 9.

At 910, method 900 may include identifying at least one downlink control channel and, at 912, transmitting acknowledgment signals in the at least one downlink control channel for a plurality of user equipment. At 914, method 900 may include spreading each acknowledgment signal with a spreading code, wherein each acknowledgment signal is associated with at least one of the plurality of user equipment and, at 916, multiplexing the spread acknowledgment signals in the at least one downlink control channel.

In an implementation, method 900 may include assigning each user equipment a location and transmitting a bit value at each location that is indicative of each acknowledgement signal comprising a positive acknowledgment signal (ACK) or a negative acknowledgment signal (NAK).

In an example, method 900 may include identifying at least one R-PDCCH, and method 900 may include transmitting at least one R-PHICH in the at least one R-PDCCH for a plurality of UE. The transmitting may include assigning each of the plurality of UE a location and transmitting a bit value at the location that is indicative of at least one of a HARQ ACK or a HARQ NAK. In some embodiments, a plurality of activity factors associated with the plurality of UE may be employed in the transmitting one R-PHICH for the plurality of UE. Further, method 900 may include spreading a first one of the HARQ ACK or a HARQ NAK with a spreading code. The first one of the HARQ ACK or the HARQ NAK may be associated with a first one of a plurality of UEs. Still further, method 900 may include multiplexing the first spread HARQ ACK or a HARQ NAK with one or more spread HARQ ACKs or HARQ NAKs. The one or more spread HARQ ACKs or HARQ NAKs may be associated with other ones of the plurality of UEs.

Figure 10A:
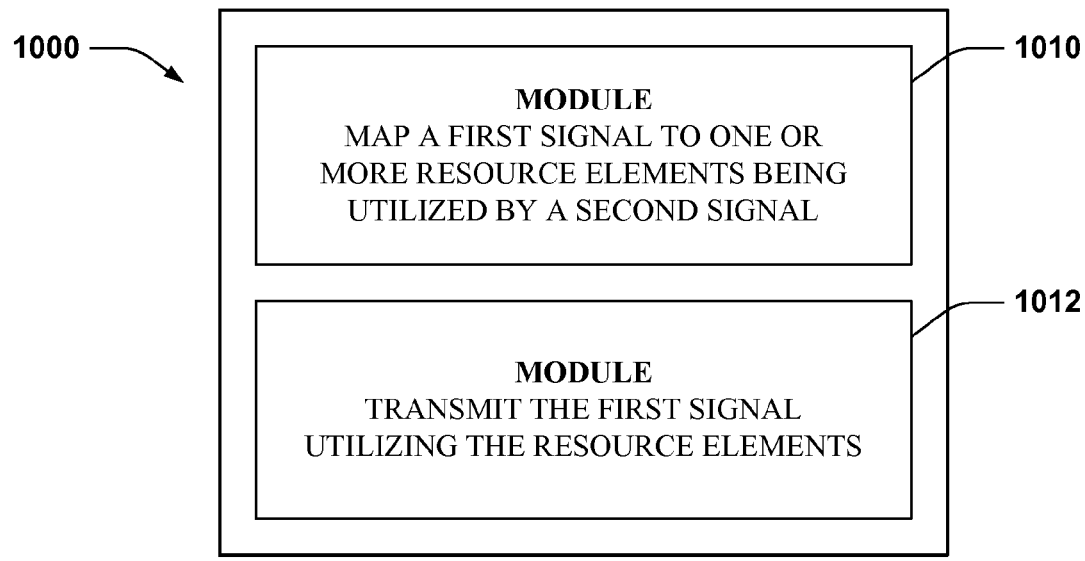
FIGS. 10A, 10B, and 11 are conceptual block diagrams illustrating functionality of an apparatus, in accordance with embodiments of the disclosure.

FIG. 10A is a conceptual block diagram 1000 illustrating the functionality of an exemplary apparatus 100. The apparatus 100 includes a module 1010 configured to map a first signal to one or more Resource Elements (REs) being utilized by a second signal and a module 1012 configured to transmit the first signal utilizing the Resource Elements (REs). The apparatus 100 may include additional modules that perform each of the steps in the aforementioned flow charts. As such, each step in the aforementioned flow charts may be performed by a module and the apparatus 100 may include one or more of those modules. In an implementation, the first signal is associated with an acknowledgement signal.

Figure 10B:
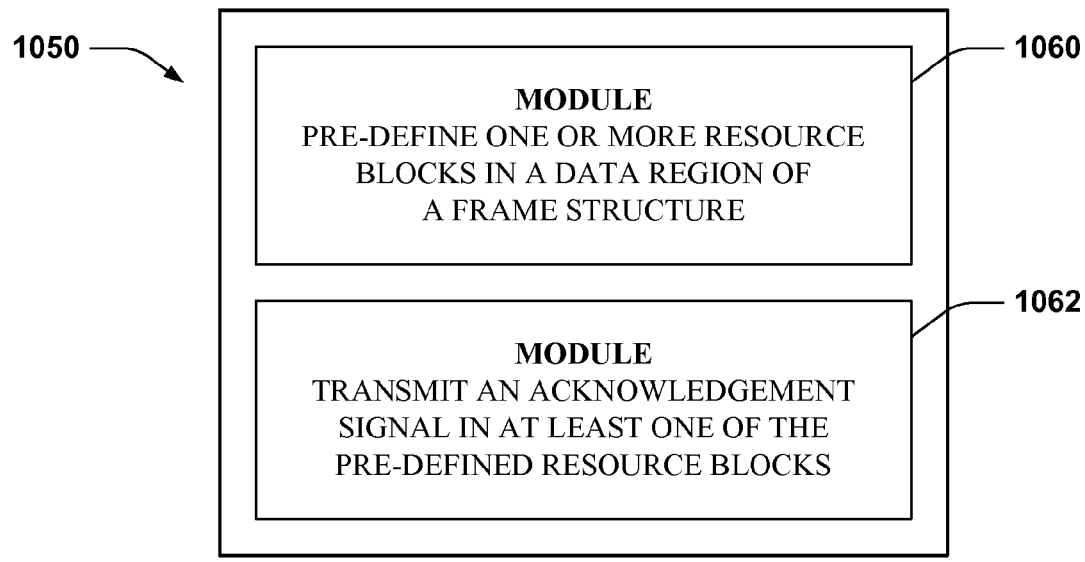

FIG. 10B is a conceptual block diagram 1050 illustrating the functionality of an exemplary apparatus 100. The apparatus 100 includes a module 1060 configured to pre-define one or more Resource Blocks (RBs) in a data region of a frame structure and a module 1062 configured to transmit an acknowledgement signal in at least one of the pre-defined Resource Blocks (RBs). The apparatus 100 may include additional modules that perform each of the steps in the aforementioned flow charts. As such, each step in the aforementioned flow charts may be performed by a module and the apparatus 100 may include one or more of those modules.

Figure 11:
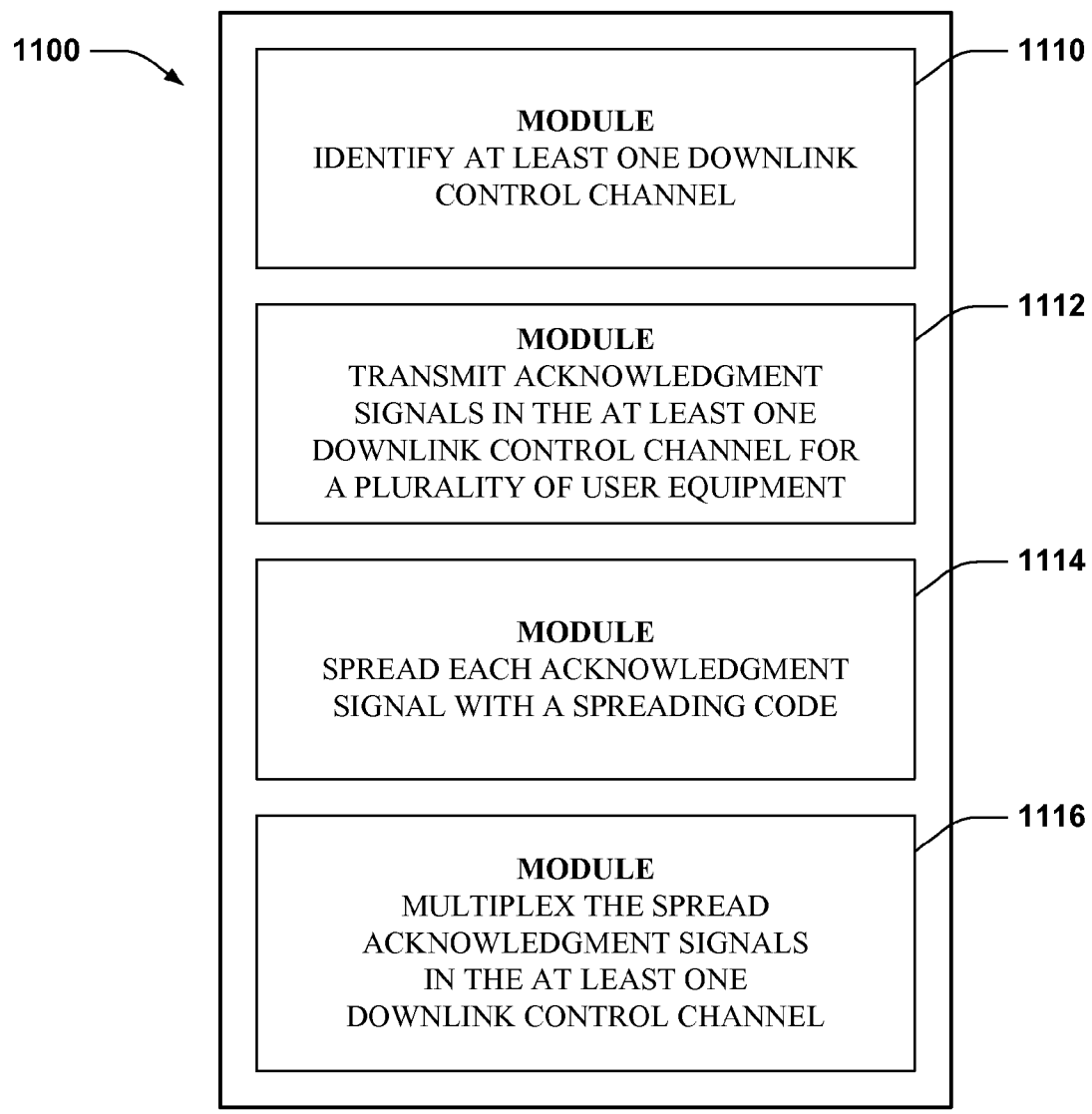

FIG. 11 is a conceptual block diagram 1100 illustrating the functionality of an exemplary apparatus 100. The apparatus 100 includes a module 1110 configured to identify at least one downlink control channel and a module 1112 configured to transmit acknowledgment signals in the at least one downlink control channel for a plurality of user equipment. The apparatus 100 may include a module 1114 configured to spread each acknowledgment signal with a spreading code, wherein each acknowledgment signal may be associated with at least one of the plurality of user equipment. The apparatus 100 may include a module 1116 configured to multiplex the spread acknowledgment signals in the at least one downlink control channel. The apparatus 100 may include additional modules. For example, in an implementation, the apparatus may include a module configured to assign each user equipment a location and a module configured to transmit a bit value at each location that is indicative of each acknowledgement signal comprising a positive acknowledgment signal (ACK) or a negative acknowledgment signal (NAK). The apparatus 100 may include additional modules that perform each of the steps in the aforementioned flow charts. As such, each step in the aforementioned flow charts may be performed by a module and the apparatus 100 may include one or more of those modules.

Referring to FIG. 1, in a configuration, the apparatus 100 for wireless communication comprises the processing system 114 to provide a means for mapping a first signal to one or more Resource Elements (REs) being utilized by a second signal and a means for transmitting the first signal utilizing the REs. In an implementation, the first signal is associated with an acknowledgement signal.

Referring to FIG. 1, in a configuration, the apparatus 100 for wireless communication comprises the processing system 114 to provide a means for pre-defining one or more Resource Blocks (RBs) in a data region of a frame structure and a means for transmitting an acknowledgement signal in at least one of the pre-defined RBs.

Referring to FIG. 1, in a configuration, the apparatus 100 for wireless communication comprises the processing system 114 to provide a means for identifying at least one downlink control channel and a means for transmitting acknowledgment signals in the at least one downlink control channel for a plurality of user equipment. The means for transmitting may include a means for assigning each user equipment a location and transmitting a bit value at each location that is indicative of each acknowledgement signal comprising a positive acknowledgment signal or a negative acknowledgment signal. The processing system 114 may further provide a means for spreading each acknowledgment signal with a spreading code, wherein each acknowledgment signal may be associated with at least one of the plurality of user equipment. The processing system 114 may further provide a means for multiplexing the spread acknowledgment signals in the at least one downlink control channel.

It will be appreciated that, in accordance with one or more aspects described herein, inferences may be made regarding or for performing the functions described herein. As utilized herein, the term to "infer" or "inference" refers generally to the process of reasoning about or inferring states of the system, environment, and/or user from a set of observations as captured via events and/or data. Inference may be employed to identify a specific context or action, or may generate a probability distribution over states, for example. The inference may be probabilistic—that is, the computation of a probability distribution over states of interest based on a consideration of data and events. Inference may also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented utilizing any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a UE. In the alternative, the processor and the storage medium may reside as discrete components in a UE.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited utilizing the phrase "means for" or, in the case of a method claim, the element is recited utilizing the phrase "step for."

What is claimed is:

1. A method to facilitate wireless communication, comprising:
    mapping an unallocated relay-physical hybrid automatic repeat request indicator channel (R-PHICH) to one or more resource elements for transmitting a first downlink signal by puncturing the one or more resource elements of at least one resource block associated with a downlink channel that includes a region associated with a second signal, the second signal being one of a demodulation reference signal, within a relay physical downlink shared channel (R-PDSCH), or within a relay physical downlink control channel (R-PDCCH); and transmitting the first downlink signal containing acknowledgment information in the mapped R-PHICH using the one or more punctured resource elements in the downlink channel and the second signal in other resource elements of the at least one resource block.

2. The method of claim 1, wherein:

the second signal is the demodulation reference signal, and the first downlink signal is transmitted in the one or more punctured resource elements of the demodulation reference signal that are transparent to a user equipment.

3. The method of claim 2, wherein the first downlink signal is transmitted with additional demodulation reference signals to assist with detection of the first downlink signal.

4. The method of claim 1, wherein transmitting the first downlink signal comprises multiplexing HARQ acknowledgment information corresponding to a plurality of user equipments by applying a Walsh code in at least one of a time domain or a frequency domain.

5. The method of claim 2, wherein the one or more punctured resource elements of the demodulation reference signal that are transparent to the user equipment are a subset of a set of resource elements of the demodulation reference signal allocated to a R-PDSCH.

6. The method of claim 1, wherein mapping the unallocated R-PHICH to one or more resource elements includes spreading the unallocated R-PHICH over one or more distinct orthogonal frequency-division multiplexing (OFDM) symbols.

7. An apparatus for facilitating wireless communication, comprising:

a memory; and at least one processor coupled to the memory and configured to:

map an unallocated relay-physical hybrid automatic repeat request indicator channel (R-PHICH) to one or more resource elements for transmitting a first downlink signal by puncturing the one or more resource elements of at least one resource block associated with a downlink channel that includes a region associated with a second signal, the second signal being one of a demodulation reference signal, within a relay physical downlink shared channel (R-PDSCH), or within a relay physical downlink control channel (R-PDCCH); and transmit the first downlink signal containing acknowledgment information in the mapped R-PHICH using the one or more punctured resource elements in the downlink channel and the second signal in other resource elements of the at least one resource block.

8. The apparatus of claim 7, wherein:

the second signal comprises the demodulation reference signal (DM-RS) for R-PDSCH, and the first downlink signal is transmitted in the one or more punctured resource elements of the DM-RS for the R-PDSCH that are transparent to a user equipment.

9. The apparatus of claim 8, wherein the first downlink signal is transmitted with additional demodulation reference signals to assist with detection of the first downlink signal.

10. The apparatus of claim 7, wherein to transmit the first downlink signal, the at least one processor is further configured to multiplex HARQ acknowledgment information corresponding to a plurality of user equipments by applying a Walsh code in at least one of a time domain or a frequency domain.

11. An apparatus for facilitating wireless communication, comprising:

means for mapping an unallocated relay-physical hybrid automatic repeat request indicator channel (R-PHICH) to one or more resource elements for transmitting a first downlink signal by puncturing the one or more resource elements of at least one resource block associated with a downlink channel that includes a region associated with a second signal, the the second signal being one of a demodulation reference signal, within a relay physical downlink shared channel (R-PDSCH), or within a relay physical downlink control channel (R-PDCCH); and means for transmitting the first downlink signal containing acknowledgment information in the mapped R-PHICH using the one or more punctured resource elements in the downlink channel and the second signal in other resource elements of the at least one resource block.

12. The apparatus of claim 11, wherein:

the second signal comprises the demodulation reference signal (DM-RS) for R-PDSCH, and the first downlink signal is transmitted in the one or more punctured resource elements of the DM-RS for the R-PDSCH that are transparent to a user equipment.

13. The apparatus of claim 12, wherein the first downlink signal is transmitted with additional demodulation reference signals to assist with detection of the first downlink signal.

14. The apparatus of claim 11, wherein the means for transmitting the first downlink signal is configured to multiplex HARQ acknowledgment information corresponding to a plurality of user equipments by applying a Walsh code in at least one of a time domain or a frequency domain.

15. A non-transitory computer-readable medium storing computer-executable code for facilitating wireless communication, comprising code which when executed by at least one processor causes the at least one processor to:

map an unallocated relay-physical hybrid automatic repeat request indicator channel (R-PHICH) to one or more resource elements for transmitting a first downlink signal by puncturing the one or more resource elements of at least one resource block associated with a downlink channel that includes a region associated with a second signal, the second signal being one of a demodulation reference signal, within a relay physical downlink shared channel (R-PDSCH), or within a relay physical downlink control channel (R-PDCCH); and transmit the first downlink signal containing acknowledgment information in the mapped R-PHICH using the one or more punctured resource elements in the downlink channel and the second signal in other resource elements of the at least one resource block.

16. The non-transitory computer-readable medium of claim 15, wherein:

the second signal comprises the demodulation reference signal (DM-RS) for R-PDSCH, and the first downlink signal is transmitted in the one or more punctured resource elements of the DM-RS for the R-PDSCH that are transparent to a user equipment.

17. The non-transitory computer-readable medium of claim 16, wherein the first downlink signal is transmitted with additional demodulation reference signals to assist with detection of the first downlink signal.

18. The non-transitory computer-readable medium of claim 15, wherein the code which when executed by the at least one processor causes the at least one processor to transmit the first downlink signal, further causes the at least one processor to:

multiplex HARQ acknowledgment information corresponding to a plurality of user equipments by applying a Walsh code in at least one of a time domain or a frequency domain.

\* \* \* \* \*